(12) United States Patent
Ruggeri

(10) Patent No.: US 10,337,619 B2
(45) Date of Patent: Jul. 2, 2019

(54) SEAL RING COMPOSITE FOR IMPROVED HYDRODYNAMIC SEAL PERFORMANCE

(71) Applicant: EATON CORPORATION, Cleveland, OH (US)

(72) Inventor: Edward N. Ruggeri, Westport, MA (US)

(73) Assignee: Eaton Intelligent Power Limited, Dublin (IE)

( * ) Notice: Subject to any disclaimer, the term of this patent is extended or adjusted under 35 U.S.C. 154(b) by 278 days.

(21) Appl. No.: 14/913,636

(22) PCT Filed: Aug. 27, 2014

(86) PCT No.: PCT/US2014/052900
§ 371 (c)(1),
(2) Date: Feb. 22, 2016

(87) PCT Pub. No.: WO2015/031474
PCT Pub. Date: Mar. 5, 2015

(65) Prior Publication Data
US 2016/0208924 A1 Jul. 21, 2016

Related U.S. Application Data

(60) Provisional application No. 61/870,706, filed on Aug. 27, 2013.

(51) Int. Cl.
*F16J 15/34* (2006.01)
(52) U.S. Cl.
CPC ....... *F16J 15/3412* (2013.01); *F16J 15/3408* (2013.01); *F16J 15/3424* (2013.01); *F16J 15/3452* (2013.01)

(58) Field of Classification Search
CPC ... F16J 15/3408; F16J 15/3412; F16J 15/3424
See application file for complete search history.

(56) References Cited

U.S. PATENT DOCUMENTS

| 1,797,735 A | 3/1931 | Spreen |
| 2,843,403 A | 7/1958 | Stevenson et al. |

(Continued)

FOREIGN PATENT DOCUMENTS

| DE | 8814442 U1 | 3/1990 |
| DE | 3901362 A1 | 7/1990 |

(Continued)

OTHER PUBLICATIONS

European Office Action, EP 147714224.4, dated Mar. 10, 2017.
European Patent Office; International Search Report and Written Opinion in counterpart PCT/US2012/045280; dated Feb. 5, 2015.

*Primary Examiner* — Nicholas L Foster
(74) *Attorney, Agent, or Firm* — Fishman Stewart PLLC

(57) ABSTRACT

A seal ring having a sealing surface (22) includes first and second portions (24, 26), and may be configured for mating with a mating ring. The first portion (24) may include a first surface roughness, the second portion (26) may include a second surface roughness, and the second surface roughness may be comparatively rougher than the first surface roughness. In embodiments, a seal assembly may include a seal ring including a first sealing surface (22), the sealing surface including first and second portions (24, 26); and a mating ring including a second sealing surface; wherein, the first portion (24) has a first surface roughness the second surface (26) includes a second surface roughness, and the second surface roughness being rougher than the first surface roughness.

21 Claims, 6 Drawing Sheets

(56) References Cited

U.S. PATENT DOCUMENTS

| | | | | |
|---|---|---|---|---|
| 3,499,653 | A | 3/1970 | Gardner | |
| 3,708,177 | A | 1/1973 | Baermann | |
| 3,782,737 | A | 1/1974 | Ludwig et al. | |
| 3,804,424 | A | 4/1974 | Gardner | |
| 3,822,068 | A | 7/1974 | Litherland | |
| 3,973,781 | A | 8/1976 | Grörich | |
| 4,082,296 | A | 4/1978 | Stein | |
| 4,145,058 | A | 3/1979 | Hady et al. | |
| 4,486,026 | A | 12/1984 | Furumura et al. | |
| 4,705,277 | A | 11/1987 | Repella | |
| 4,795,168 | A | 1/1989 | Adams et al. | |
| 4,834,400 | A * | 5/1989 | Lebeck | F16C 29/02 277/399 |
| 4,887,395 | A | 12/1989 | Lebeck et al. | |
| 4,908,081 | A | 3/1990 | Heinrich et al. | |
| 4,969,810 | A | 11/1990 | Stolle et al. | |
| 4,973,068 | A | 11/1990 | Lebeck | |
| 5,078,411 | A | 1/1992 | Geco | |
| 5,092,612 | A | 3/1992 | Victor et al. | |
| 5,169,159 | A | 12/1992 | Pope et al. | |
| 5,174,584 | A | 12/1992 | Lahrman | |
| 5,180,173 | A | 1/1993 | Kimura et al. | |
| 5,195,757 | A | 3/1993 | Dahll | |
| 5,222,743 | A | 6/1993 | Goldswain et al. | |
| 5,224,714 | A | 7/1993 | Kimura et al. | |
| 5,375,853 | A | 12/1994 | Wasser et al. | |
| 5,398,943 | A | 3/1995 | Shimizu et al. | |
| 5,454,572 | A | 10/1995 | Pospisil | |
| 5,492,341 | A | 2/1996 | Pecht et al. | |
| 5,496,047 | A | 3/1996 | Goldswain et al. | |
| 5,509,664 | A | 4/1996 | Borkiewicz | |
| 5,516,118 | A | 5/1996 | Jones | |
| 5,529,315 | A | 6/1996 | Borrino et al. | |
| 5,558,341 | A | 9/1996 | McNickle et al. | |
| 5,577,739 | A | 11/1996 | Ciotola | |
| 5,605,339 | A | 2/1997 | Pecht et al. | |
| 5,702,110 | A | 12/1997 | Sedy | |
| 5,722,665 | A | 3/1998 | Sedy et al. | |
| 5,730,447 | A | 3/1998 | Dawson et al. | |
| 5,941,532 | A | 8/1999 | Flaherty et al. | |
| 5,947,481 | A | 9/1999 | Young | |
| 5,952,080 | A * | 9/1999 | Etsion | F16C 33/14 428/156 |
| 6,089,756 | A | 7/2000 | Ono et al. | |
| 6,105,968 | A | 8/2000 | Yeh et al. | |
| 6,142,478 | A | 11/2000 | Pecht et al. | |
| 6,145,843 | A | 11/2000 | Hwang | |
| 6,149,160 | A | 11/2000 | Stephens et al. | |
| 6,189,896 | B1 | 2/2001 | Dickey et al. | |
| 6,213,473 | B1 | 4/2001 | Lebeck | |
| 6,257,589 | B1 | 7/2001 | Flaherty et al. | |
| 6,257,859 | B1 | 7/2001 | Koda et al. | |
| 6,446,976 | B1 | 9/2002 | Key et al. | |
| 6,805,358 | B2 | 10/2004 | Dawson et al. | |
| 7,377,518 | B2 | 5/2008 | Lai | |
| 7,500,676 | B2 | 3/2009 | Tejima | |
| 7,770,898 | B2 | 8/2010 | Dietle et al. | |
| 7,914,007 | B2 | 3/2011 | Berard et al. | |
| 8,074,995 | B2 | 12/2011 | Vasagar et al. | |
| 8,091,898 | B2 | 1/2012 | Garrison | |
| 8,100,403 | B2 | 1/2012 | Short | |
| 8,162,322 | B2 | 4/2012 | Flaherty | |
| 8,360,436 | B2 * | 1/2013 | Teshima | F16J 15/3424 277/399 |
| 8,474,826 | B2 | 7/2013 | Villeneuve et al. | |
| 8,628,092 | B2 | 1/2014 | Deo et al. | |
| 9,234,594 | B2 * | 1/2016 | Inoue | F16J 15/3424 |
| 9,494,239 | B2 * | 11/2016 | Hosoe | F16J 15/3412 |
| 9,512,923 | B2 * | 12/2016 | Inoue | F16J 15/3424 |
| 9,829,043 | B2 * | 11/2017 | Inoue | F16J 15/3412 |
| 9,915,289 | B2 * | 3/2018 | Inoue | F16J 15/3412 |
| 2003/0189294 | A1 * | 10/2003 | Tejima | F16J 15/3424 277/399 |
| 2005/0094906 | A1 | 5/2005 | Satoh | |
| 2008/0042364 | A1 | 2/2008 | Zheng et al. | |
| 2008/0272552 | A1 | 11/2008 | Zheng et al. | |
| 2008/0284105 | A1 | 11/2008 | Vasagar et al. | |
| 2009/0279817 | A1 | 11/2009 | Shimizu et al. | |
| 2009/0297077 | A1 | 12/2009 | Nii et al. | |
| 2011/0101616 | A1 * | 5/2011 | Teshima | F16J 15/3424 277/358 |
| 2014/0117625 | A1 | 5/2014 | Short et al. | |
| 2014/0167362 | A1 * | 6/2014 | Hosoe | F16J 15/3412 277/400 |
| 2015/0042045 | A1 * | 2/2015 | Inoue | F16J 15/3424 277/431 |
| 2015/0084286 | A1 * | 3/2015 | Inoue | F16J 15/3424 277/400 |
| 2015/0097341 | A1 * | 4/2015 | Inoue | F16J 15/3424 277/400 |
| 2015/0123350 | A1 | 5/2015 | Itadani et al. | |
| 2015/0275684 | A1 | 10/2015 | Thatte et al. | |
| 2016/0195139 | A1 * | 7/2016 | Inoue | F16J 15/3412 384/138 |
| 2017/0227056 | A1 * | 8/2017 | Inoue | F16C 33/74 |
| 2018/0010690 | A1 * | 1/2018 | Itadani | F16J 15/164 |
| 2018/0038411 | A1 * | 2/2018 | Inoue | F16C 33/743 |
| 2018/0058502 | A1 * | 3/2018 | Hosoe | F16C 33/103 |

FOREIGN PATENT DOCUMENTS

| | | |
|---|---|---|
| DE | 29601165 U1 | 3/1996 |
| DE | 19722870 | 9/2000 |
| EP | 0306979 A2 | 3/1989 |
| EP | 0402333 A2 | 12/1990 |
| EP | 0992723 A2 | 4/2000 |
| EP | 1302709 A2 | 4/2003 |
| JP | 0450559 A | 2/1992 |
| JP | 5164249 | 6/1994 |
| WO | 95/06211 A1 | 3/1995 |
| WO | 01/66982 A1 | 9/2001 |
| WO | 02/093046 A1 | 11/2002 |
| WO | 2004/053365 A1 | 6/2004 |
| WO | WO2013006560 A1 | 1/2013 |

* cited by examiner

ସEAL RING COMPOSITE FOR IMPROVED
HYDRODYNAMIC SEAL PERFORMANCE

CROSS-REFERENCE TO RELATED
APPLICATION

This application is a national stage filing based upon International PCT Application No. PCT/US2014/052900, with an international filing date of Aug. 27, 2014, which claims the benefit of U.S. Provisional Patent Application No. 61/870,706, filed Aug. 27, 2013, both of which are hereby incorporated by reference as though fully set forth herein.

TECHNICAL FIELD

The present disclosure relates to rotary seals, including hydrodynamic rotary seals.

BACKGROUND

Mechanical seals are widely used to provide a seal between a stationary housing, often containing a fluid such as oil, and a rotating shaft that passes through the housing. Typically, such seals include a stationary seal ring (e.g., a stator) about the shaft but fixed to the housing, and another seal ring (e.g., a mating ring or a rotor), which rotates with the rotating shaft.

Contact between the stator and rotor during operation may create heat as a result of frictional effects between the components. If the amount of heat is undesirable, it could potentially reduce the life of or damage the seal, which could cause undesired deformation with respect to the sealing faces of the rotor and/or stator, and could potentially impair other nearby components.

Hydrodynamic seals attempt to reduce friction by including grooves of some form in the sealing face of the rotor, for example, and without limitation, the grooves as described in U.S. Pat. No. 8,474,826 (Villeneuve et al.), which is assigned to the assignee of this application, and is hereby incorporated herein by reference in its entirety. The grooves may facilitate formation of a layer of fluid between a stator and a rotor during operation, which may be referred to as a hydrodynamic film. Under certain conditions, the hydrodynamic film may cause a separation between the stator and rotor, which may be referred to as lift off.

SUMMARY

In embodiments, a seal ring may comprise a sealing surface configured for mating with a mating ring. The seal ring may include first and second portions, wherein the first portion includes a first surface roughness, the second surface includes a second surface roughness, and the second surface roughness is rougher than the first surface roughness. The second surface may, for example, be at least about four times rougher than the first surface roughness.

In embodiments, a seal ring may be configured to be connected to a housing, and the seal ring may comprise: a sealing surface configured for mating with a rotating mating ring; a first radial portion of the sealing surface, the first radial portion including a first surface roughness; and a second radial portion of the sealing surface, the second radial portion including a second surface roughness; wherein, the second surface roughness is rougher than the first surface roughness.

In embodiments, a seal assembly may comprise: a seal ring including a first sealing surface, the sealing surface including first and second portions; and a mating ring including a second sealing surface; wherein, the first portion has a first surface roughness, the second surface includes a second surface roughness, and the second surface roughness is rougher than the first surface roughness.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by appended claims.

Figure 1:
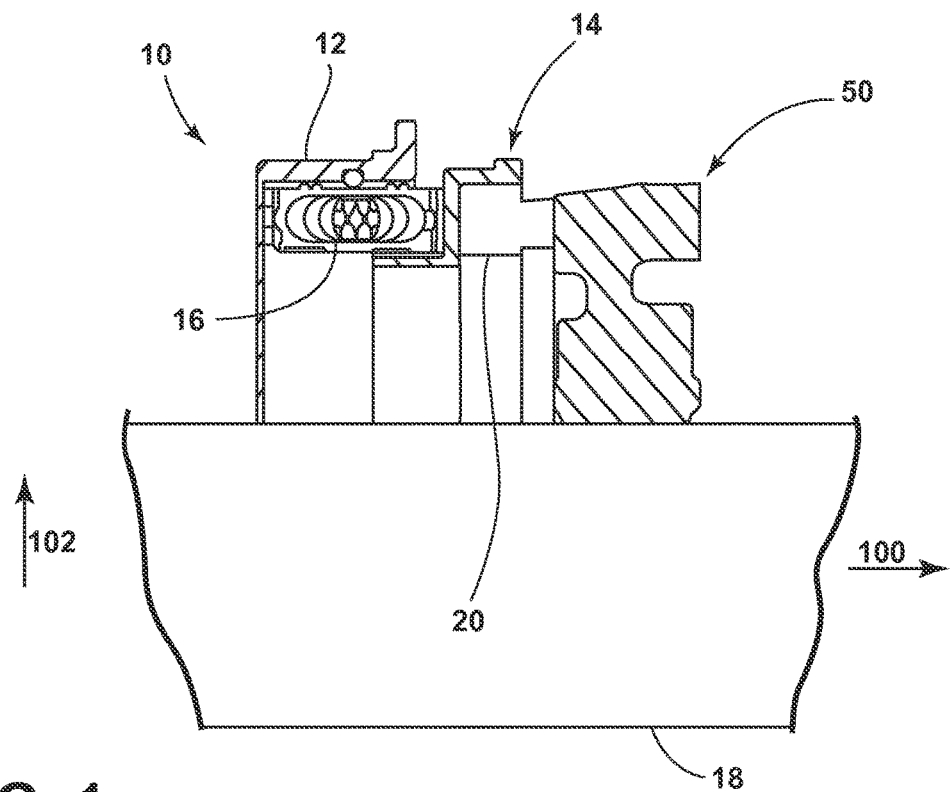
FIG. 1 is a partial cross-sectional view generally illustrating a portion of a seal ring assembly in accordance with an embodiment of the present disclosure.

Referring to the drawings, FIG. 1 generally illustrates an embodiment of a seal ring assembly 10. Seal ring assembly 10 may include a seal ring 20 and a mating ring 50. Seal ring 20 may also be referred to herein as stator 20. Mating ring 50 may also be referred to herein as seal plate 50 or rotor 50.

Seal ring 20 may be connected to a housing 12 and/or may be connected to a support 14. In embodiments, a biasing member 16 may be connected to housing 12 and support 14. Biasing member 16 may bias support 14 and/or seal ring 20, at least partially, in a direction toward mating ring 50. Biasing member 16 may include a metallic component, such as, for example, a bellows, and/or may include a non-metallic component such as an elastomer or plastic.

Figure 2:
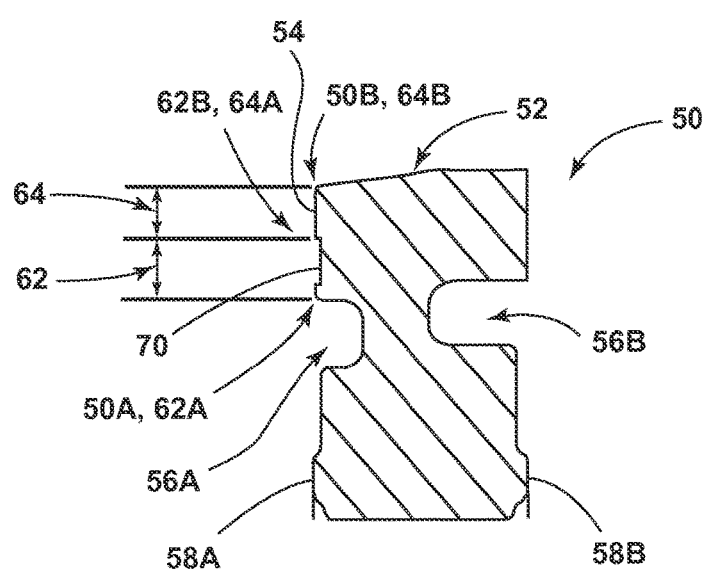
FIG. 2 is a partial cross-sectional view generally illustrating a portion of a mating ring in accordance with an embodiment of the present disclosure.

FIG. 2 generally illustrates a partial cross-section of mating ring 50. Mating ring 50 may include one or more of a variety of shapes, sizes, configurations, and/or materials. In embodiments, mating ring 50 may have a generally circular shape, and may include a radially outward portion/ segment with a face (configured for operational communication with a corresponding portion/segment of the seal ring 20) having an inner diameter 50A and/or an outer diameter 50B, such as generally illustrated. Mating ring 50 may be configured to have a generally rectangular shape, viewed in cross section. Mating ring 50 may include one or more recesses (e.g., recesses 56A, 56B), which may be configured to address/reduce stresses associated with the mating ring 50. Recesses 56A, 56B may be configured to address/reduce coning. Mating ring 50 may include one or more protrusions (e.g., protrusions 58A, 58B), which may extend further radially outwardly than adjacent portions. Protrusions 58A, 58B may be configured, for example, to connect the mating ring 50 to another component, e.g., a moving component 18 (e.g., a shaft). In embodiments, mating ring 50 may include one or more angled surfaces 52.

Mating ring 50 may be connected to a separate component, which may be a moving component 18. Moving component 18 may, for example, include a shaft that may be configured to rotate and/or translate in one or more directions. Moving component 18 may also be referred to herein as shaft 18, but is not so limited. Mating ring 50 may be configured to rotate and/or translate with moving component 18. Additionally or alternatively, mating ring 50 may be configured to move relative to moving component 18 and/or remain relatively stationary with respect to moving component 18. For example, and without limitation, mating ring 50 may be configured to rotate as a moving component 18 rotates, and mating ring 50 may be configured to remain stationary relative to moving component 18 if the moving component 18 translates in an axial direction (such as depicted direction 100).

A sealing surface 60 of mating ring 50—which may be configured for operational communication with a corresponding sealing surface 22 of the seal ring 20—may include one or more grooves 70, which further may comprise hydrodynamic grooves. In this context, the term "groove" is intended to encompass a wide variety of formations or configurations in which material is removed or absent. Sealing surface 60 may include a radially inward portion/region 62 and a radially outward portion/region 64. The inner diameter 62A of radially inward portion/region 62 may, for example, coincide with inner diameter 50A. The outer diameter 64B of radially outward portion/region 64 may, for example, coincide with outer diameter 50B. The outer diameter 62B of radially inward portion/region 62 and the inner diameter 64A of radially outward portion/region 64 may coincide with each other.

Grooves 70 may be provided exclusively in one of the radially inward and radially outward portions/regions 62, 64. Alternatively, with embodiments, grooves 70 may be provided in both the radially inward and radially outward portions/regions 62, 64. Grooves 70 may be mostly, or primarily, provided in one of the radially inward portion/ region 62 and the radially outward portion/region 64, and may extend only partially into the other portion/region.

Figure 3A:
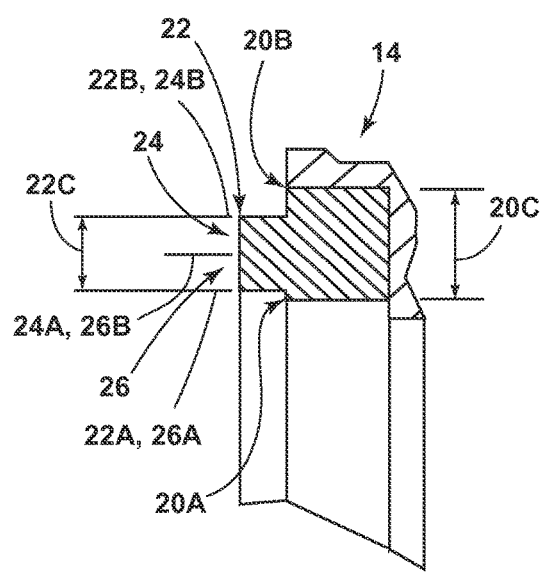
FIGS. 3A and 3B are partial cross-sectional views generally illustrating portions of seal ring assemblies in accordance with embodiments of the present disclosure.

Referring to FIG. 3A, a partial cross-section of an embodiment of a seal ring 20 is generally illustrated. Seal ring 20 may be generally circular in shape. Viewed in cross section (such as generally illustrated), seal ring may include a generally rectangular form or shape. Seal ring 20 may include an inner diameter 20A, an outer diameter 20B, and/or a sealing surface face 22. Seal ring 20 may be a single or unitary component. Sealing surface 22 may be configured for operational communication with a corresponding portion/segment of the mating ring 50. Sealing surface 22 may include an inner diameter 22A, an outer diameter 22B, and/or a radial width 22C, such as generally illustrated.

In embodiments, sealing surface 22 may include a first region 24 (that may be positioned radially outwardly) and a second region 26 (that may comparatively be positioned radially inwardly). First region 24 may include and/or be configured as a sealing portion/area, and may correspond to (e.g., be generally aligned with) a non-grooved/smooth portion of mating ring 50. First region 24 may include an inner diameter 24A, and outer diameter 24B, a radial width 24C, and/or an axial length 24D. First region 24 may include a relatively smooth surface. For example, without limitation, first region 24 may include a surface roughness of about 4 RA (or "Ra") or finer. It is noted that various representations of surface roughness may be employed, including, for example and without limitation, Ra and RMS, which are both representations of surface roughness, although calculated differently (Ra is calculated as the Roughness Average of a surface's measured microscopic peaks and valleys, and RMS is calculated as the Root Mean Square of a surface's measured microscopic peaks and valleys). In embodiments, first region 24 may extend radially from at or about a diameter of sealing surface 22 (e.g., inner diameter 22A or outer diameter 22B) toward a diameter of second region 26 (e.g., inner diameter 26A or outer diameter 26B). For example, and without limitation, first region 24 may extend from sealing surface outer diameter 22B (e.g., diameters 22B and 24B may be generally aligned) radially inward to at or about outer diameter 26B of second region 26 (e.g., diameters 24A and 26B may be generally aligned).

Figure 3B:
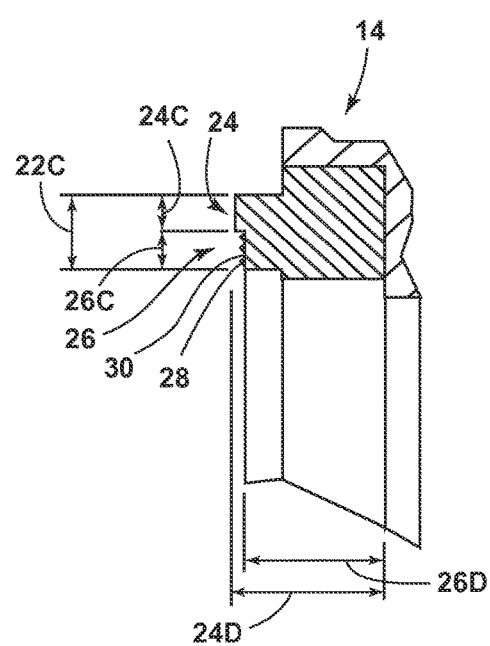
Figure 3C:
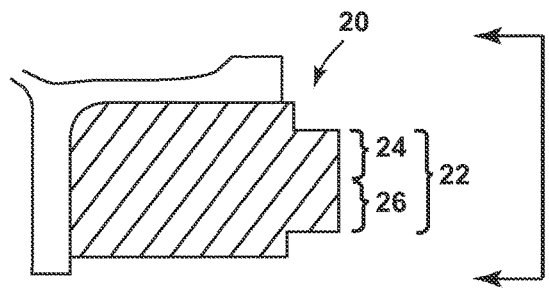
FIG. 3C is a partial cross-sectional view generally illustrating a portion of a seal ring in accordance with an embodiment of the present disclosure.
Figure 3D:
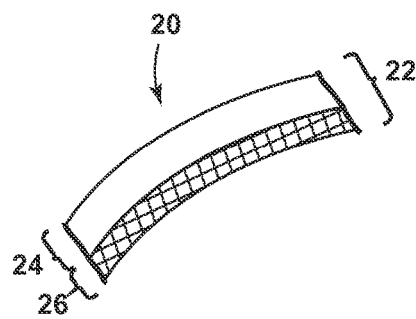
FIG. 3D is a partial side view (in the direction generally illustrated in FIG. 2) of a portion of a seal ring in accordance with an embodiment of the present disclosure.

In embodiments, seal ring second region 26 may include and/or be configured as a pumping area. Second region 26 may include an inner diameter 26A, an outer diameter 26B, a radial width 26C, and/or and axial length 26D. Second region 26 may include a comparatively rougher surface than first region 24. For example, without limitation, second region 26 may include a surface roughness greater than about 4 RA. In embodiments, second region may include a surface roughness that is at least four times rougher than the surface roughness of first region. As generally illustrated in FIG. 3B, the second region 26 surface roughness may include a pattern of peaks 28 and valleys 30 and/or may include a random configuration of peaks 28 and valleys 30. The depth of one or more of the valleys 30 may vary and may be, for example and without limitation, about 100 to 500 millionths of an inch. In other embodiments, first region may include a surface roughness that is at least about four times rougher than the surface roughness of the second region.

With embodiments, it may be a benefit to configure the surface of seal ring second region 26 to be sufficiently rough to help create/increase an associated operational fluid boundary layer 44. The roughness associated with seal ring second region 26 may serve one or more functions, including, for example and without limitation, directing fluid/air and/or feeding a compressor (e.g., a region including grooves 70). The inclusion of a sufficiently rough surface in connection with seal ring second region 26 may, inter alia, help create a turbulent zone, or a larger turbulent zone, from which, for instance, corresponding grooves 70 of mating ring 50 may draw fluid/air.

Without limitation, it has been found that for embodiments of a seal ring 20, there can be a benefit in having seal ring second region 26 be configured to be significantly smaller than seal ring first region 24. For example, and without limitation, radial width 24C may be substantially greater than radial width 26C. With general reference to FIGS. 3A-3E, and for example and without limitation, the width of the "band" associated with seal ring second region 26 (e.g., radial width 26C) may be about 25% of (or even less than) the total or combined "band" width of seal ring second region 26 and seal ring first region 24. For example and without limitation, in an embodiment, the width 26C of the "band" associated with seal ring second region 26 may be about 0.050 inches (or even less) and the total or combined "band" width of seal ring second region 26 and seal ring first region 24 (e.g., width 22C) may be about 0.200 inches.

Figure 3E:
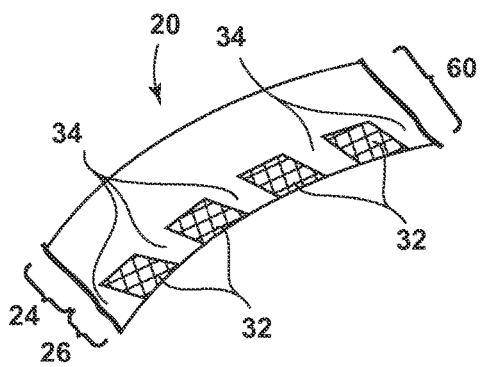
FIG. 3E is a partial side view (in the direction generally illustrated in FIG. 2) of a portion of a seal ring in accordance with an embodiment of the present disclosure.
Figure 3F:
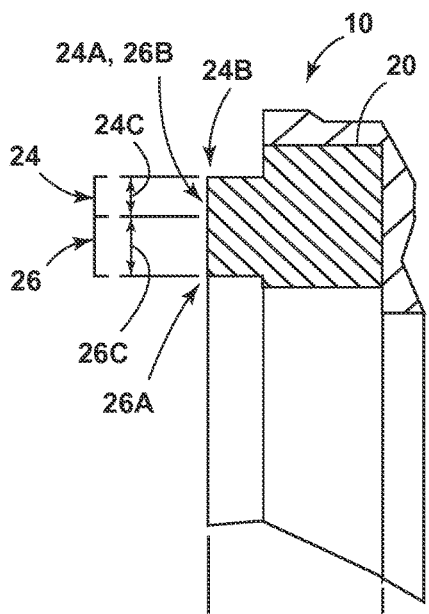
FIG. 3F is a partial cross-sectional view generally illustrating a portion of a seal ring assembly in accordance with an embodiment of the present disclosure.

In other embodiments, as generally illustrated in FIG. 3F, seal ring second region 26 may include a radial width 26C that is greater that the radial width 24C of seal ring first region 24. In embodiments, second region radial width 26C may be two or more times greater than second region radial width 24C. For example, and without limitation, first region radial width 24C may be about 0.050 inches and second region radial width 26C may be about 0.150 inches or about 0.200 inches.

In embodiments, first region 24 and second region 26 may be adjacent but may be completely separate (e.g., may not overlap in a circumferential direction). For example, in embodiments, first region 24 may be disposed completely radially outwardly of second region 26, and in other embodiments, first region 24 may be disposed completely radially inwardly of second region 26.

As generally illustrated in FIG. 3B (and FIGS. 4A, 4B, and 6B) first region 24 may include a greater axial length 24D than second region 26 and/or may extend farther toward mating ring 50 than second region 26. In an embodiment, for example and without limitation, a biasing member 16 (see, e.g., FIG. 1) may be configured to bias seal ring 20 toward mating ring 50. First region 24 may be configured for operative contact or communication with mating ring sealing surface 60, while second region 26 may be configured to not contact mating ring 50. Second region 26 may include an axial length 26D that is smaller than first region axial length 24D, which may be a result of the surface finish of second region 26 (e.g., etching to increase surface roughness). For example, seal ring sealing surface 22 may initially include a uniform surface (e.g., uniform axial length, surface roughness, etc.). Then, the surface roughness of second region 26 may be increased, for example, by etching second region 26. The reduction/etching of the second region 26 may also, at least in part, reduce the axial length and/or average axial length 26D of second region 26.

In embodiments, first region 24 and/or second region 26 may extend along all or substantially all of the circumference of seal ring 20. A roughness associated with seal ring second region 26 may be circumferentially provided (e.g., along all or substantially all of the circumference of sealing ring 20). However, for some embodiments, the roughness associated with seal ring second region 26 may be interrupted or intermittent circumferentially (e.g., rough/less rough/rough/less rough in an alternating circumferential configuration). Additionally, the comparatively "rough surface" portions 32 in such an alternating "rough surface" 32 and comparatively "smooth surface" 34 embodiment may be provided at angles (e.g., oblique angles relative to the radial direction 102) on seal ring/stator 20. Even though the alternating surfaces 32, 34 may be relatively stationary (e.g., because in this embodiment the alternating surfaces 32, 34 may be provided to seal ring/stator 20, as opposed to a mating ring/rotor 50), the alternating portions 32, 34 can help to direct or drive fluid/air, for example, into associated hydrodynamic grooves 70 associated with rotor 50. In embodiments, smooth surface 34 may include the same or similar roughness as first region 24, and/or rough surface 32 may be at least about four times rougher than smooth surface 34. Without limitation, an example of an embodiment including alternating surfaces is generally illustrated in FIG. 3E.

With embodiments of the disclosure, a boundary layer of fluid/air may be particularly beneficial in applications in which the viscosity of the relevant fluid is low, and/or in which the nature of the environment provides certain challenges (e.g., high altitude). Additionally, with the various embodiments, a comparatively rough surface (e.g., of seal ring second region 26), whether continuous or intermittently configured, may be provided on a side of sealing ring 20 to facilitate high pressure-to-low pressure fluid movement (which may depend on what is being sealed). That is, the rough surface may be provided on a side that is intended to scavenge air or a working fluid. Consequently, for some applications the high pressure side might be the outside of the seal (e.g., at outer diameter 20B), while for other applications the high pressure side may be on the inside of the seal (e.g., at inner diameter 20A).

In embodiments, and as generally illustrated in FIGS. 3A-3E, seal ring assembly 10 may include an inner diameter pumping configuration, in which seal ring 20 and mating ring 50 may cooperate to pump fluid from seal ring sealing surface inner diameter 22A toward seal ring sealing surface outer diameter 22B. For example, seal ring first region 24 may be located at or near outer diameter 22B and seal ring second region 26 may be located at or near inner diameter 22A. Seal ring second region 26 may be configured to correspond to mating ring radially inward portion/region 62, and mating ring grooves 70 may be located in radially inward portion/region 62 (e.g., grooves 70 may extend through radially inward portion/region 62 from inner diameter 50A to an inner diameter 64A of radially outward portion/region 64). Seal ring region 26 may, via its roughness, help promote the flow of fluid into grooves 70 as mating ring 50 rotates (e.g., with shaft 18), and grooves 70 may convey the fluid from inner diameter 22A toward outer diameter 22B. As fluid reaches the end of grooves 70, such as generally at or near outer diameter 22B, the fluid may create a fluid boundary layer 44 between seal ring 20 and mating ring 50. Fluid boundary layer 44 may be created generally between seal ring second region 26 and a non-grooved portion 54 of mating ring 50.

Figure 4A:
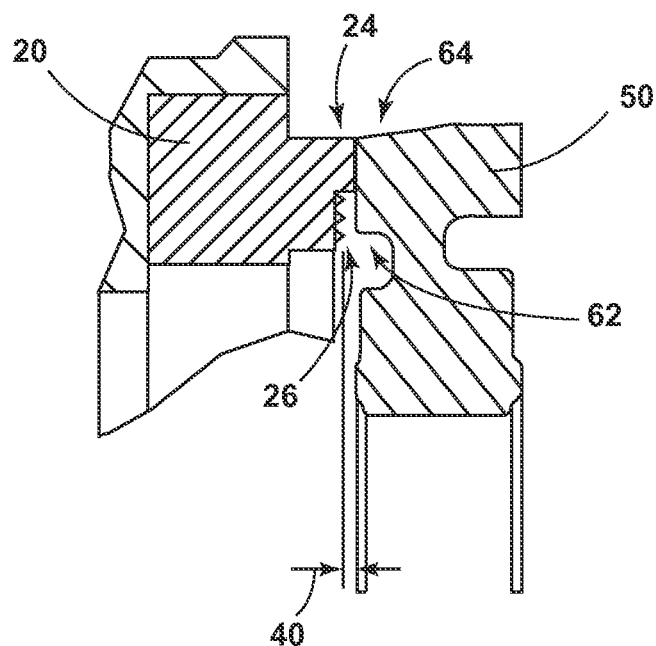
FIGS. 4A and 4B are partial cross-sectional views generally illustrating portions of seal ring assemblies in accordance with embodiments of the present disclosure.

As generally illustrated in FIG. 4A, in an initial state of the inner diameter pumping configuration, biasing member 16 may bias seal ring first region 24 into contact with mating ring radially outward portion/region 64 and seal ring second region 26 may be at a distance 40 from (e.g., not in operative communication or contact with) and/or across from mating ring radially inward portion/region 62. In such a configuration, the relatively smooth surfaces of the first region 24 of seal ring 20 and radially outward portion/region 64 of mating ring 50 may be in contact with each other and the relatively rough seal ring second region 26 may be positioned at distance 40 from grooves 70 of mating ring radially inward portion/region 62. Distance 40 may correspond to seal ring second region 26 not providing any load support to seal assembly 10 (e.g., seal assembly 10 may be configured for operation independent of load support from seal ring second portion 26). First region 24 may be configured to provide some or all of the load support for seal assembly 10.

Figure 4B:
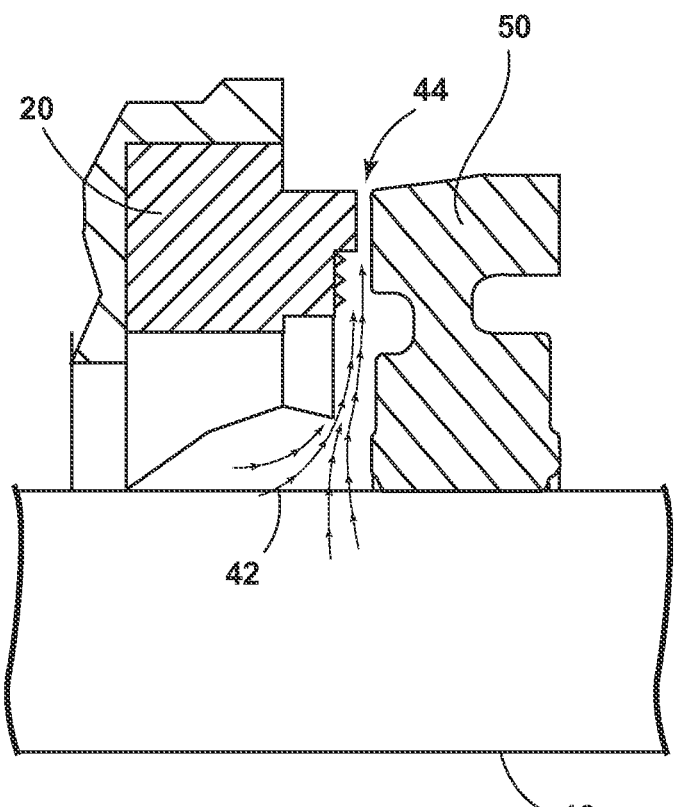

As generally illustrated in FIG. 4B, in embodiments, as shaft 18 rotates, the cooperation between the relatively rough second region 26 and the grooves 70 of mating ring second region 64 may facilitate fluid flow 42 from inner diameter 22A toward outer diameter 22B. Improved fluid flow 42 toward outer diameter 22B may increase the fluid velocity profile and/or the fluid boundary layer 44 thickness. Increased fluid velocity profile and/or fluid boundary layer 44 thickness may increase pressure between seal ring sealing surface 22 and mating ring sealing surface 60, which may, for some embodiments, reduce intimate contact between seal ring 20 and mating ring 50, causing the seal ring 20 to lift off from the mating ring 50. In embodiments, an increased fluid boundary layer 44 may reduce a minimum rotational speed of shaft 18 that causes seal ring 20 to lift off from mating ring 50.

Figure 5A:
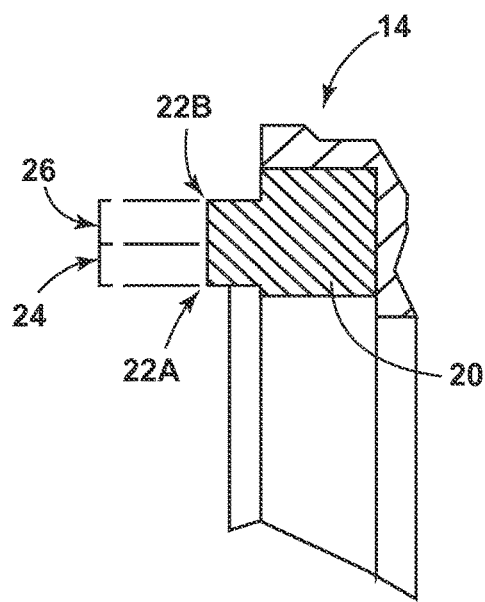
FIGS. 5A and 5B are partial cross-sectional views generally illustrating portions of seal ring assemblies in accordance with embodiments of the present disclosure.
Figure 5B:
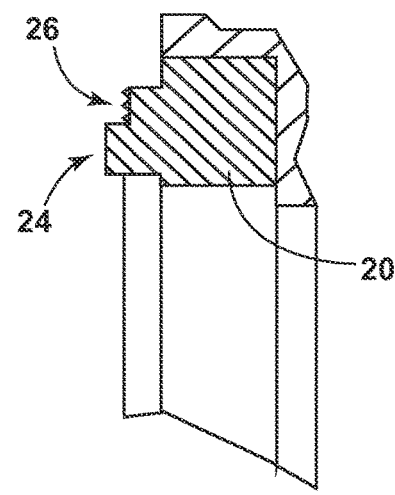

In an embodiment, as generally illustrated in FIGS. 5A and 5B, seal ring assembly 10 may include an outer diameter pumping configuration, in which seal ring 20 and mating ring 50 may cooperate to pump fluid from seal ring sealing surface outer diameter 22B toward seal ring sealing surface inner diameter 22A. For example, seal ring second region 26 may be located at or near outer diameter 22B and seal ring first region 24 may be located at or near inner diameter 22A. Grooves 70 of mating ring 50 may be located at or near outer diameter 50B (e.g., in radially outward portion/region 64). Seal ring first region 24 and mating ring radially inward portion/region 62 may be configured to contact or operatively communicate with each other, while seal ring second region 26 and mating ring grooves 70 may be configured to remain at a distance 40 (see, e.g., FIG. 4A) from each other (e.g., not in contact or operative communication with each other).

Figures 6A, 6B:
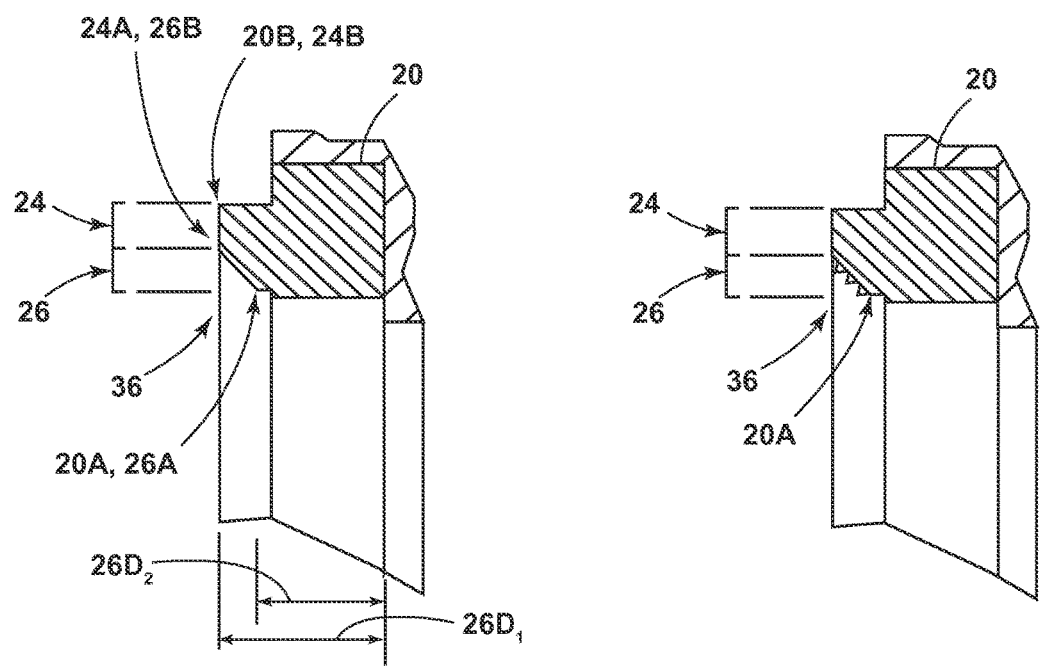
FIGS. 6A and 6B are partial cross-sectional views generally illustrating portions of seal ring assemblies in accordance with embodiments of the present disclosure.

In embodiments, seal ring 20 and/or mating ring 50 may include a generally sloped surface 36. For example, as generally illustrated in FIGS. 6A and 6B, axial length 26D of seal ring second region 26 may decrease toward inner diameter 22A (e.g., axial length $26D_1$, at or near second region outer diameter 26B, may be the largest axial length 26D, and $26D_2$, at or near second region inner diameter 26A, may be the smallest axial length 26D). The change in second region axial length 26D between axial lengths $26D_1$ and $26D_2$ may, for example and without limitation, be about 200 millionths of one inch. In embodiments, seal ring second region 26 may include sloped surface 36 such that second region 26 is disposed at an oblique angle relative to first region 24.

In embodiments, a method of sealing may include providing a seal ring assembly 10 including seal ring 20 and mating ring 50, the mating ring 50 connected to moving component 18. The method may include one or more of rotating at least one of mating ring 50 and seal ring 20 relative to the other, pumping fluid from at least one of seal ring sealing surface inner diameter 22A and seal ring sealing surface outer diameter 22B toward the other of inner diameter 22A and outer diameter 22B, increasing fluid velocity and/or increasing a thickness of boundary layer 44 via roughened portions of seal ring second region 26. Seal ring 20 and/or mating ring 50 may include some, all, or variations of the features described herein, such as, without limitation, sloped surfaces (e.g., sloped surface 36), relatively rough surfaces (e.g., second region 26), and grooves (e.g., grooves 70). For example, and without limitations, grooves 70 may be provided to seal ring 20 and mating ring 50 may include corresponding roughened portions.

The foregoing descriptions of specific embodiments of the present disclosure have been presented for purposes of illustration and description. They are not intended to be exhaustive or to limit the invention to the precise forms disclosed, and various modifications and variations are possible in light of the above teaching. It should be understood that the present disclosure is not limited to the examples and/or embodiments described herein. For example, references to a single element are not so limited and may include one or more of such element. It should also be understood that while embodiments are described in which mating ring may include grooves, seal ring may additionally or alternatively, include grooves. Further, while embodiments of seal ring may be described as including a relatively rough portion, mating ring may, additionally or alternatively, include a relatively rough portion. Also, while moving component may be described as moving, moving component may also remain stationary relative to one or more other components that may move (e.g., housing). It is intended that the scope of the invention be defined by the claims appended hereto and their equivalents.

What is claimed is:

1. A seal assembly, comprising:
a stationary seal ring including a first sealing surface, the first sealing surface including first and second portions; and
a rotating mating ring including a second sealing surface;
wherein the first portion includes a first surface roughness,
the second portion includes a second surface roughness,
the second surface roughness is rougher than the first surface roughness,
the first portion is at least partially aligned with a smooth portion of the second sealing surface,
the second portion is at least partially aligned with a grooved portion of the second sealing surface,
the second portion is provided on a side of the stationary seal ring for scavenging a working fluid,
the second portion is configured to increase flow of said working fluid to the grooved portion, and
the increased flow of said working fluid is configured to provide a fluid boundary layer between the stationary seal ring and the rotating mating ring.

2. The seal assembly of claim 1, wherein the grooved portion of the mating ring includes hydrodynamic grooves.

3. The seal assembly of claim 1, wherein the second surface roughness includes peaks and valleys.

4. The seal assembly of claim 3, wherein the peaks and valleys are disposed in a pattern.

5. The seal assembly of claim 3, wherein the peaks and valleys are disposed in a random configuration.

6. The seal assembly of claim 3, wherein a depth of one or more of the valleys is about 100 to 500 millionths of an inch.

7. The seal assembly of claim 1, wherein the first portion and the second portion are adjacent and separate.

8. The seal assembly of claim 1, wherein the second portion is configured as a pumping area.

9. A method of operating the seal assembly of claim 1, including:
rotating the rotating mating ring while the stationary seal ring remains substantially stationary;
promoting, via the second portion, flow of said working fluid to said groove portion of the second sealing surface;
conveying, via said grooved portion, said working fluid from an inner diameter of the stationary seal ring toward an outer diameter of the stationary seal ring; and
creating said fluid boundary layer between the first portion and a non-grooved portion of the second sealing surface.

10. The method of claim 9, wherein promoting flow of said working fluid includes creating a turbulent zone of said working fluid from which the grooved portion is configured to draw said working fluid.

11. The seal assembly of claim 1, wherein an axial length of the second portion is less than an axial length of the first portion.

12. The seal assembly of claim 1, wherein the first portion extends further radially outward than the second portion.

13. The seal assembly of claim 1, wherein the second portion includes alternating rough sections and less rough sections.

14. The seal assembly of claim 13, wherein the alternating rough sections are disposed at an oblique angle relative to a radial direction.

15. The seal assembly of claim 1, wherein the second portion is sloped such that the second portion is disposed at an oblique angle relative to the first portion.

16. The seal assembly of claim 1, wherein the second surface roughness is at least four times rougher than the first surface roughness.

17. The seal assembly of claim 1, wherein the first portion includes a first radial width, the second portion includes a second radial width, and the first radial width is wider than the second radial width.

18. The seal assembly of claim 1, wherein the first portion and the second portion do not circumferentially overlap with each other.

19. The seal assembly of claim 14, wherein the rough sections include the second surface roughness and the less rough sections include the first surface roughness.

20. The seal assembly of claim 1, wherein an axial length of the second radial portion is less than an axial length of the first radial portion.

21. The seal assembly of claim 1, wherein the first portion is provided radially inward of the second portion.

\* \* \* \* \*